Sept. 20, 1938.   G. MAIURI   2,130,503
REFRIGERATION
Filed July 28, 1938   2 Sheets-Sheet 1
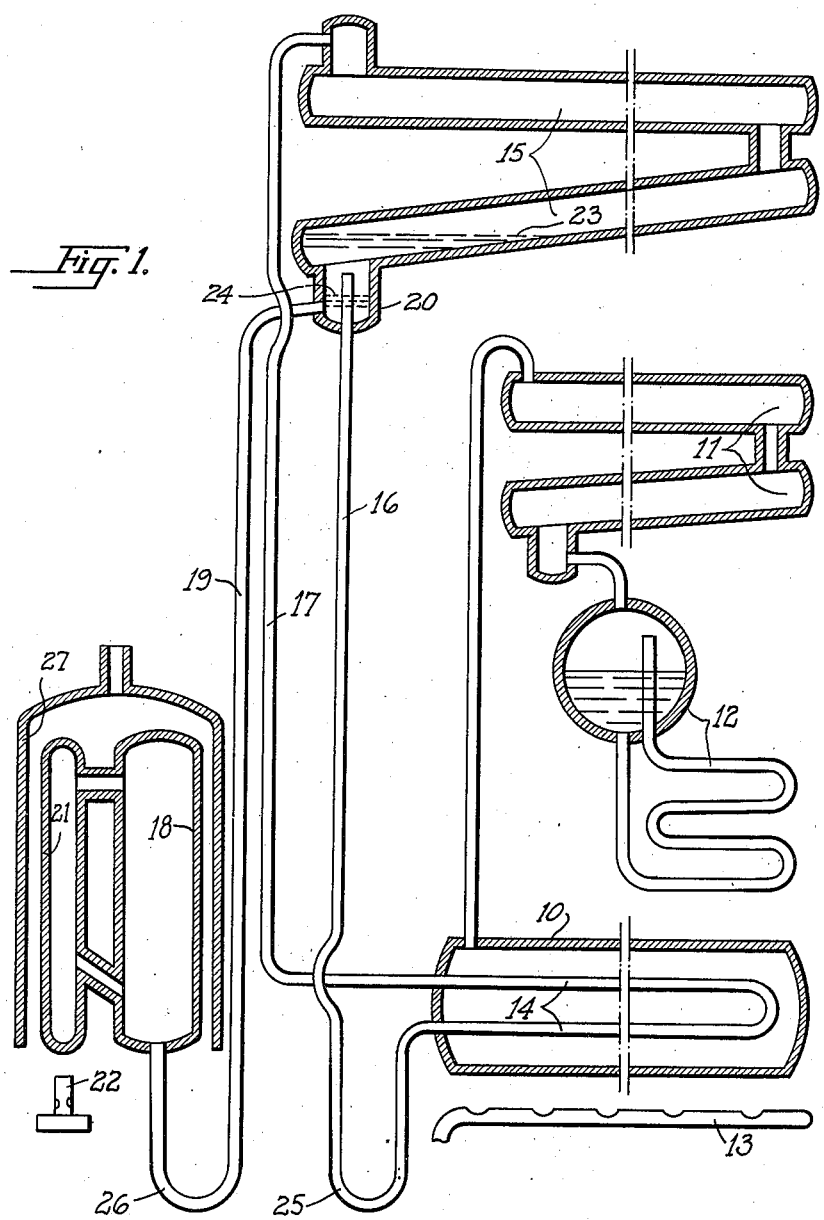
INVENTOR.
Guido Maiuri
D. E. Heath
his ATTORNEY.

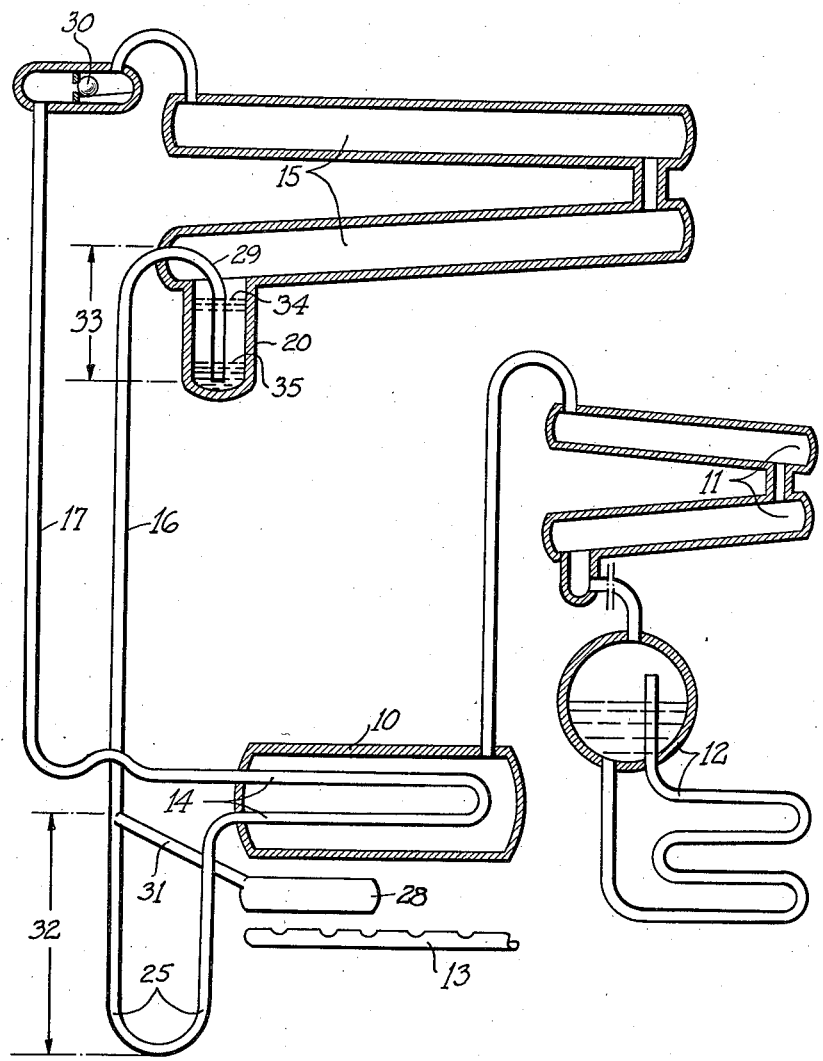

Patented Sept. 20, 1938

2,130,503

UNITED STATES PATENT OFFICE 2,130,503

REFRIGERATION

Guido Maiuri, London, England

Application July 28, 1938, Serial No. 221,657
In Great Britain February 23, 1937

4 Claims. (Cl. 62—5)

This invention relates to intermittent reversing absorption or adsorption refrigerating machines employing solid or liquid absorbents or solid adsorbents.

The object of the invention is to establish during the absorption or adsorption phase, and interrupt during the driving off phase, a circulation of cooling liquid in heat exchange proximity with the generator-absorber or generator-adsorber (hereinafter referred to as the generator) of refrigerating machines, between the generator and an air-cooled or otherwise cooled cooler.

The cooling liquid passes from the cooler down a return pipe to a chamber, such as a coil or jacket, in heat-exchange proximity to the absorbent or adsorbent in the generator, where it becomes heated and whence it ascends a flow pipe to the cooler.

In order to exert an intense cooling effect on the generator and thus quickly cool the absorbent or adsorbent therein to a re-absorbing or re-adsorbing temperature, and also to obtain a quickly starting cooling circulation, a cooling liquid is employed which readily vaporizes at the temperature of the heated generator, so extracting therefrom considerable heat to supply the latent heat necessary for vaporization, such as, for instance, ammonia, methyl chloride or ethyl chloride. A mixture of vapor and liquid ascends the flow pipe, quickly starting an energetic circulation, the flow pipe preferably discharging above the volume of cooling liquid in the cooler.

It has already been proposed in cooling systems of the above described kind for generators of intermittent reversing absorption refrigerating machines and containing liquid and having two limbs one of which is heated by the heat of absorption, during the heating phase of the generator, to interrupt the supply of the cooling liquid to the generator by the application of heat to the other limb.

It has also already been proposed in cooling systems of the above described kind for generators of intermittent reversing absorption or adsorption refrigerating machines, during the heating phase of the generator to interrupt the circulation of the cooling liquid by the application of heat to a chamber extraneous to but connected to the cooling system so as to generate in the chamber vapor which by its pressure closes a valve interrupting the circulation.

It has also been proposed in apparatus for maintaining a predetermined temperature condition, to render active and inactive a fluid vaporizing and condensing system, by applying and ceasing to apply under thermostatic control heat to a chamber to displace liquid from the chamber into the system and withdraw the liquid from the system into the chamber.

According to the present invention, in an intermittent reversing absorption or adsorption refrigerating machine the generator of which is cooled by evaporation of a circulating cooling medium and the circulation of the cooling medium between the generator and a cooler is interrupted during the heating phase of the generator and is controlled by the application of heat to a chamber, extraneous to but connected to the circulating system, to form vapor, the delivery of the cooling liquid by the cooler is hydrostatically controlled by the displacement of cooling liquid from and into the chamber.

For example, the application of heat, for instance by a gas flame or electric heater, to a chamber connected to the cooling circuit, causes by the evaporation of liquid in the chamber the displacement of sufficient liquid into the cooling circuit to overflow a weir obstructing flow from the cooler to the generator. On cessation of heating of this chamber, condensation of the vapor reduces the pressure therein and withdraws sufficient liquid to render the weir effective.

In the above described arrangement, when the heating of the generator ceases, heating of the displacement chamber commences, and vice versa. It may, however, be arranged that the application of heat to the generator interrupts the flow of liquid in the cooling circuit, to become re-established on cessation of heating of the generator. This can be effected by liquid becoming vaporized in a chamber heated by the generator flame or heater, and connected to the return pipe of the cooling circuit and when cool being occupied by the liquid, the vapor generated breaking the suction of a syphon at the upper end of the return pipe.

Representative examples of intermittent reversing absorption refrigerating machines according to the invention are illustrated diagrammatically on the accompanying drawings, in which:

Fig. 1 is a diagrammatic elevation partly in section of a machine in which a cooling circuit is established by heat; and Fig. 2 is a similar view of a machine in which a cooling circuit is interrupted by heat.

Referring to Fig. 1, 10 is the generator of an intermittent reversing absorption refrigerating machine, of which 11 is the condenser connected to the generator 10, and 12 is the evaporator connected to the condenser 11. As usual in this kind of refrigerating machine, the generator 10 is periodically heated, for instance by a gas burner 13, to drive off vaporized refrigerant, such as ammonia, into the condenser 11, where the vapor is condensed to flow in the liquid state into the evaporator 12. After an interval, the heating of the generator 10 is stopped whereafter on the generator 10 cooling sufficiently, the pressure in the apparatus diminishes sufficiently for liquid refrigerant in the evaporator 12 to vaporize and exert a refrigerating action, the vapor being absorbed by the absorbent medium in the generator 10. The quicker the generator 10 becomes cooled after heating, the sooner the re-absorption phase and the production of cold starts, and for this purpose a pipe coil 14 traversed by a cooling liquid is located in the generator 10.

The cooling liquid flows to the coil 14 from a tank 15 cooled by air or otherwise, along a return pipe 16 and returns to the tank 15 by a flow pipe 17, the whole forming an ordinary convection circuit.

The cooling liquid is a liquid which vaporizes at the temperature of the heated generator 10 and condenses in the cooled tank 15 under the pressure in the closed cooling circuit, such as ammonia, methyl chloride or ethyl chloride. Thus the generator 10 becomes rapidly cooled by the large amount of heat taken therefrom to supply the latent heat of vaporization of the cooling liquid.

Also the vapor formed, in ascending the return pipe 17, mixed as it is with liquid, quickly starts and maintains a circulation of the cooling liquid.

A closed chamber 18 is connected at the bottom by a pipe 19 to a sump 20 which is the lowest part of the tank 15. This closed chamber 18 is connected near the top and bottom to a small closed chamber 21 alongside arranged to be heated by a gas burner 22. The closed chamber 18 is located below the level of the tank 15 so that when cool it becomes filled with liquid so that the level of the liquid falls in the sump to below the level of the upper end of the flow pipe 16 which extends upwards to above the bottom of the sump 20. This withdrawal of liquid from the tank 15 interrupts the circulation of cooling liquid as it no longer can overflow the weir constituted by the upwardly extended upper end of the flow pipe 16.

When the small chamber 21 is heated by the gas burner 22 the liquid therein and in the closed chamber 18 becomes heated and the vapor which is formed forces a quantity of the liquid up the pipe 19 into the sump 20. This raises the level of the liquid in the tank 15 to above the upper end of the flow pipe 16 and continuity of the cooling circuit is restored. The alternative levels of liquid in the sump 20 and tank 15 are, for instance, as indicated at 23 and 24.

The flow pipe 16 and the pipe 19 are both extended downwards, as inverted syphons or U-bends 25, 26, to beneath the levels of the coil 14 and the closed chamber 18 in order to promote the presence of liquid therein.

The chambers 18 and 21 are shrouded by a hood 27.

The generator 10 and the chamber 21 are alternately and not simultaneously heated.

In the arrangement illustrated in Fig. 2, the burner 13 which heats the generator 10 also simultaneously heats a closed chamber 28 to interrupt, instead of to restore, the cooling circulation along the flow and return pipes 16, 17. In this construtlon the upper end of the flow pipe 16 is formed as a syphon 29 dipping into the liquid in the sump 20 of the tank 15. Also between the upper end of the return pipe 17 and the tank 15 there is a non-return valve 30 opening towards the tank 15.

The closed chamber 28 communicates by an upwardly directed pipe 31 with the flow pipe 16.

The liquid level in the tank 15 and sump 20 never stands above the crest of the syphon 29, so that to descend the flow pipe 16 the liquid must always ascend the shorter, dipping limb of the syphon 29.

The chamber 28 is initially full of liquid.

On the chamber 28 being heated by the burner 13, which simultaneously heats the generator 10, the liquid in the chamber 28 boils and the vapor therefrom passes up the pipe 31 and forces back the liquid in the flow pipe 16 and eventually ascends to the crest of and breaks the syphon action in the syphon 29. The circulation of liquid from the tank 15 through the generator cooling coil 14 is thereby interrupted.

The length 32 of the ascending limb of the inverted syphon 25 at the bottom of the flow pipe 16 is greater than the length 33 of the ascending limb of the syphon 29 at the top of the flow pipe 16, so as to ensure that the vapor will force back the liquid through and break the syphon action in the syphon 29 instead of the vapor escaping around the inverted syphon 25.

On cessation of heating of the chamber 28 and generator 10, the chamber 28 cools and vapor therein condenses. The consequent reduction of pressure in the chamber 28 exerts a suction on the flow pipe 16, which draws liquid from the sump 20 up the syphon 29 and thereby starts the flow of cooling liquid through the coil 14 to cool the generator.

The non-return valve 30 prevents the suction exerted by the condensation of vapor in the chamber from drawing liquid or vapor along the return pipe 17, and thereby avoiding priming the syphon 29.

34 indicates the level of the liquid in the sump 20 during the heating of the generator and interruption of the cooling circuit, and 35 the level during cooling. It should be noted that whereas in the construction illustrated in Fig. 1 the level 23 is the higher level in the sump 20 during circulation of the cooling liquid, as this circulation in this construction depends on the overflowing of a weir (the upwardly extended upper end of the flow pipe 16), in the construction illustrated in Fig. 2 the level 35 is the lower level in the sump 20 during circulation of the cooling liquid as this circulation in this construction depends upon withdrawal of liquid to start the syphon action.

The refrigerating machine may, in the known manner, be duplex, the generator of one being heated while that of the other cools. However, with the very effective cooling which can be effected by the present invention, a long interval before absorption or adsorption re-starts, is avoided, so that a simple machine will meet most domestic requirements.

What is claimed is:

1. An intermittent absorption refrigeration apparatus including a generator-absorber, a vaporizer for cooling said generator-absorber, a condenser connected to said vaporizer and forming therewith a vaporization-condensation circuit for heat transfer fluid, a vessel outside of said circuit but connected thereto, means to heat said vessel to vaporize liquid therein, and said circuit being arranged so that flow of liquid to said vaporizer is controlled by heating of said vessel.

2. Refrigeration apparatus as set forth in claim 1 in which said vessel is connected to said circuit so that liquid is displaced to and from said circuit upon formation and collapse respectively of vapor in said vessel and flow of cool liquid is hydrostatically controlled by said displacement.

3. Refrigeration apparatus as set forth in claim 1 in which said vessel is arranged so that liquid is displaced therefrom into said circuit upon formation of vapor in the vessel, and said circuit includes a weir or dam between said condenser and said vaporizer, displacement of liquid into said circuit causing liquid to overflow said weir.

4. Refrigeration apparatus as set forth in claim 1 in which said circuit includes a syphon for flow of liquid to said vaporizer, and said vessel is connected to said circuit so that said syphon is stopped and started responsive to formation and collapse respectively of vapor in said vessel.

GUIDO MAIURI.